(12) United States Patent
Nguyen et al.

(10) Patent No.: US 10,144,301 B2
(45) Date of Patent: Dec. 4, 2018

(54) OPTIMIZED COMPENSATION COILS FOR WIRELESS POWER TRANSFER SYSTEM

(71) Applicant: DENSO International America, Inc., Southfield, MI (US)

(72) Inventors: Trong-Duy Nguyen, Novi, MI (US); Jeff C. White, LaSalle (CA)

(73) Assignee: DENSO International America, Inc., Southfield, MI (US)

( * ) Notice: Subject to any disclaimer, the term of this patent is extended or adjusted under 35 U.S.C. 154(b) by 218 days.

(21) Appl. No.: 15/046,784

(22) Filed: Feb. 18, 2016

(65) Prior Publication Data

US 2017/0240055 A1 Aug. 24, 2017

(51) Int. Cl.
*H02J 7/00* (2006.01)
*B60L 11/18* (2006.01)

(52) U.S. Cl.
CPC ......... *B60L 11/182* (2013.01); *B60L 11/1811* (2013.01)

(58) Field of Classification Search
USPC .................................. 320/106–115
See application file for complete search history.

(56) References Cited

U.S. PATENT DOCUMENTS

| | | | |
|---|---|---|---|
| 5,821,731 A | 10/1998 | Kuki et al. | |
| 7,023,177 B1 | 4/2006 | Bussinger | |
| 8,810,205 B2 | 8/2014 | Ichikawa | |
| 8,975,864 B2 | 3/2015 | Kim | |
| 2012/0091959 A1 | 4/2012 | Martin et al. | |
| 2012/0293118 A1* | 11/2012 | Kim | H02J 5/005 320/108 |
| 2013/0169062 A1 | 7/2013 | Maikawa et al. | |

(Continued)

FOREIGN PATENT DOCUMENTS

| | | |
|---|---|---|
| JP | 2014030329 A | 2/2014 |
| JP | 2014082339 A | 5/2014 |
| WO | WO-2011049352 A2 | 4/2011 |
| WO | WO-2012165244 A1 | 12/2012 |
| WO | WO-2014004551 A1 | 1/2014 |

OTHER PUBLICATIONS

Madawala, U. K., et al., "A Bidirectional Inductive Power Interface for Electric Vehicles in V2G Systems," IEEE Transactions on Industrial Electronics, vol. 58, No. 10, pp. 4789-4796, Oct. 2011.

(Continued)

*Primary Examiner* — Binh Tat
(74) *Attorney, Agent, or Firm* — Harness, Dickey & Pierce, P.L.C.

(57) ABSTRACT

A wireless power transfer system for charging a battery located in a vehicle includes a primary side network and a secondary side network. The primary side network includes a transmitting coil and a primary side compensation network. The primary side compensation network includes a primary compensation coil. The secondary side network includes a receiving coil and a secondary side compensation network. The secondary compensation network includes a secondary compensation coil. The primary compensation coil and the secondary compensation network has one of an unipolar coil design and a bipolar coil design, and the transmitting coil and the receiving coil has the other one of the unipolar coil design and the bipolar coil design.

14 Claims, 8 Drawing Sheets

(56) References Cited

U.S. PATENT DOCUMENTS

| 2013/0207601 | A1* | 8/2013 | Wu | H02M 3/33576 |
| | | | | 320/108 |
| 2014/0091756 | A1* | 4/2014 | Ofstein | H02J 5/005 |
| | | | | 320/108 |
| 2014/0239890 | A1 | 8/2014 | Patwardhan | |
| 2015/0015197 | A1 | 1/2015 | Mi et al. | |

OTHER PUBLICATIONS

Pantic, Zeljko, et al., "ZCS LCC-Compensated Resonant Inverter for Inductive-Power-Transfer Application," IEEE Transactions on Industrial Electronics, vol. 58, No. 8, pp. 3500-3510, Aug. 2011.

Keeling, Nicholas A., et al., "A Unity-Power-Factor IPT Pickup for High-Power Applications," IEEE Transactions on Industrial Electronics, vol. 57, No. 2, pp. 744-751, Feb. 2010.

Deng, Junjun, et al., "Magnetic Integration of LCC Compensated Resonant Converter for Inductive Power Transfer Applications," 2014 IEEE Energy Conversion Congress and Exposition, pp. 660-667, Sep. 18, 2014.

Li, Siqi, et al., "A Double-Sided LCC Compensation Network and Its Tuning Method for Wireless Power Transfer," IEEE Transactions on Vehicular Technology, vol. 64, No. 6, pp. 2261-2273, Jun. 2015.

Borage, Mangesh, et al., "Analysis and Design of an LCL-T Resonant Converter as a Constant-Current Power Supply," IEEE Transactions on Industrial Electronics, vol. 52, No. 6, pp. 1547-1554, Dec. 2005.

* cited by examiner

OPTIMIZED COMPENSATION COILS FOR WIRELESS POWER TRANSFER SYSTEM

FIELD

The field of the invention relates to optimized compensation coils for a wireless power transfer system.

BACKGROUND

This section provides background information related to the present disclosure which is not necessarily prior art.

In an effort to reduce fossil fuel emissions and other pollutants emitted from automobiles that use internal combustion engines, hybrid electric automobiles (HEV) and electric automobiles (EV) have been designed and implemented to mitigate the environmental effects of the internal combustion engine. In order to provide power to these battery systems, the HEVs and EVs may be provided with power by connecting to the electrical grid. The battery system of an HEV or EV may be connected to the electrical grid by using a copper cable. Typically, the copper cable will have one end that has a plug, thus allowing the battery system to connect to the electrical grid.

The battery system of an HEV or EV may also connect to the electrical grid by implementing a wireless or contactless charging system. A wireless charging system may utilize the mutual inductance between two inductive coils to provide power to the battery system of the HEV or EV. The electrical grid may induce a voltage at a first coil and, as a result of the inductive coupling between the first coil and a second coil connected to the battery system of the HEV or EV, the second coil will induce a voltage and subsequently charge the battery system of the HEV or EV.

While the wireless charging system has the advantage of not requiring cables, connectors, and plugs, the wireless charging system often has low power efficiency. The efficiency of wireless charging systems may be affected by the resistance of the wire, the energy losses in the core material of the inductor, and the parasitic capacitance due to the electric fields between each turn being at slightly different potentials. As a result, there is a need for a compensation topology to address the power efficiency issues of the wireless power transfer system.

SUMMARY

This section provides a general summary of the disclosure, and is not a comprehensive disclosure of its full scope or all of its features.

The present disclosure is generally directed toward a wireless power transfer system for charging a battery in a vehicle. The wireless power transfer system may include a primary side network and a secondary side network. The primary side network includes a transmitting coil and a primary side compensation network. The primary side compensation network may include a primary compensation coil. The transmitting coil is configured to receive power from a power supply by way of the primary side compensation network.

The secondary side network, which may be positioned in the vehicle, is inductively coupled to the primary side network and is configured to receive power from the primary side network. The secondary side network may include a receiving coil and a secondary side compensation network. The receiving coil is configured to induce a voltage in response to the transmitting coil receiving power. The secondary side compensation network includes a secondary compensation coil and may transmit the voltage from the receiving coil to the battery.

The primary compensation coil and the secondary compensation network are configured to have one of an unipolar coil design and a bipolar coil design, and the transmitting coil and the receiving coil are configured to have the other one of the unipolar coil design and the bipolar coil design. With the primary compensation coil and the secondary compensation coil having one of coil designs and the transmitting coil and the receiving coil having the other one of the coil designs, the mutual inductance between the primary compensation coil and the transmitting coil and between the receiving coil and the secondary compensation coil can be reduced. Thus, increasing the efficiency of the wireless power transfer system.

Further areas of applicability of the present disclosure will become apparent from the detailed description, the claims, and the drawings. The detailed description and specific examples are intended for purposes of illustration only, and are not intended to limit the scope of the disclosure.

BRIEF DESCRIPTION OF THE DRAWINGS

The drawings described herein are for illustrative purposes only of selected embodiments and not all possible implementations, and are not intended to limit the scope of the present disclosure.

In the drawings, reference numbers may be reused to identify similar and/or identical elements.

DETAILED DESCRIPTION

There have been a variety of topologies proposed to improve the efficiency of a wireless power transfer system. For example, compensation topologies have been implemented into wireless power transfer systems to improve the power efficiency. As an example, a compensation topology comprises a transmitting coil and a compensation coil in an LCL converter, which is located on the primary side of the network. An additional capacitor is serially connected to the transmitting coil and, as a result, an LCC compensation network may be formed on the primary side as well.

Similarly, the secondary side of the network implements an LCC compensation network so that unity power factor is obtained at the output.

However, due to the various cross couplings between main coils and compensation coils, it may be difficult to integrate compensation coils into wireless power transfer systems. Even though the integration of compensation coils into the wireless power transfer system may shrink the size of the system, the cross coupling among the compensation coils and main coils may contribute circulating power losses to the wireless power transfer system, thereby decreasing the power efficiency of the power system.

The present disclosure discloses a topology that implements optimized compensation coils and minimizes cross coupling among the main coils and compensation coils. With optimized compensation coils, the circulating power losses are minimized. In addition, the integration of the compensation coils with the main coils makes the wireless power transfer system compact and efficient.

Example embodiments will now be described more fully with reference to the accompanying drawings.

Figure 1:
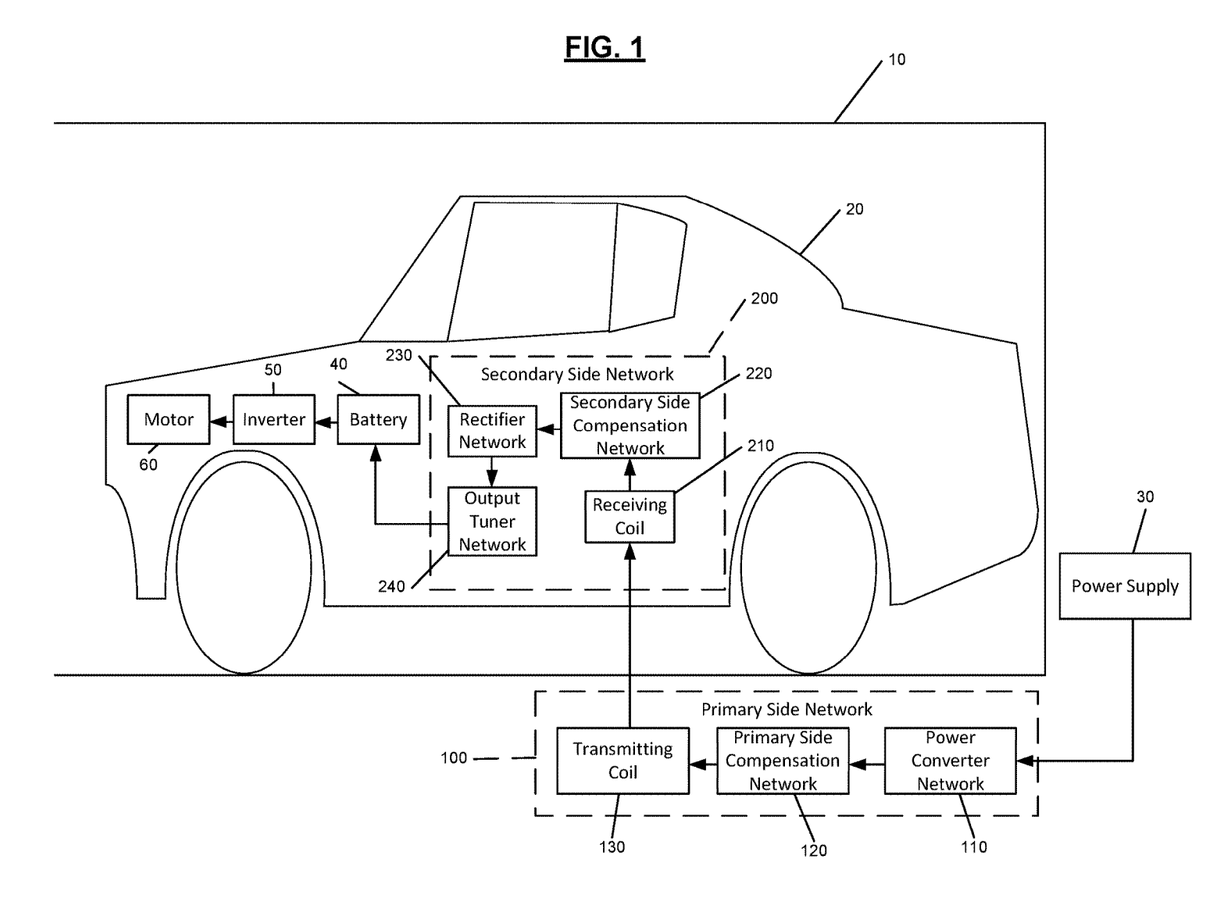
FIG. 1 is a high-level functional block diagram of a wireless power transfer system with optimized compensation coils implemented in an automobile.

FIG. 1 is a high-level functional block diagram of a wireless power transfer system with optimized compensation coils implemented in an automobile. In one embodiment, the wireless power transfer system includes a primary side network 100 and a secondary side network 200. The primary side network may be implemented in a garage 10 at a home, and the secondary side network 200 may be mounted to the underside of a vehicle 20. Thus, when the vehicle 20 enters into the garage 10, a battery 40 of the vehicle 20 may begin to charge wirelessly. Alternatively, the primary side network 100 may be implemented at a charging station located at, for example, a gas station, a rest area, and/or a location other than the home.

The primary side network 100 may include a power converter network 110, a primary side compensation network 120, and a transmitting coil 130. The power converter network 110 converts an AC signal from a power supply 30 to an input AC signal. The power converter network 110 may also convert a DC signal from the power supply 30 to the input AC signal. The power supply 30 may either be a DC voltage source or an AC voltage source from an electrical grid. The primary side compensation network 120 may mitigate leakage inductance of the wireless power transfer system. The transmitting coil 130 transfers power to the secondary side network 200 by way of inductive coupling between the transmitting coil 130 and the secondary side network 200.

The secondary side network 200 may include a receiving coil 210, a secondary side compensation network 220, a rectifier network 230, and an output tuner network 240. The receiving coil 210 receives power from the transmitting coil 130 as a result of the inductive coupling between the transmitting coil 130 and the receiving coil 210. The secondary side compensation network 220 is configured to mitigate leakage inductance of the wireless power transfer system. The rectifier network 230 converts the AC signal from the receiving coil 210 to a DC signal. The output tuner network 240, which may couple the rectifier network 230 and the battery 40 of the vehicle, may provide a voltage at a resonant frequency. The DC signal outputted by the secondary side network 200 charges the battery 40 of the vehicle 20.

The battery 40 may output a DC signal to an inverter 50 that converts the DC signal of the battery 40 into a motor input AC signal. The motor input AC signal may drive a motor 60 as a result of the coupling between the inverter 50 and the motor 60. In other embodiments, the vehicle 20 may include a DC motor and, therefore, the inverter 50 may be removed. Accordingly, the DC signal from the battery 40 may be directly supplied to the DC motor. In addition to supplying power to the motor 60, the battery 40 may supply power to other components in the vehicle.

Figure 2:
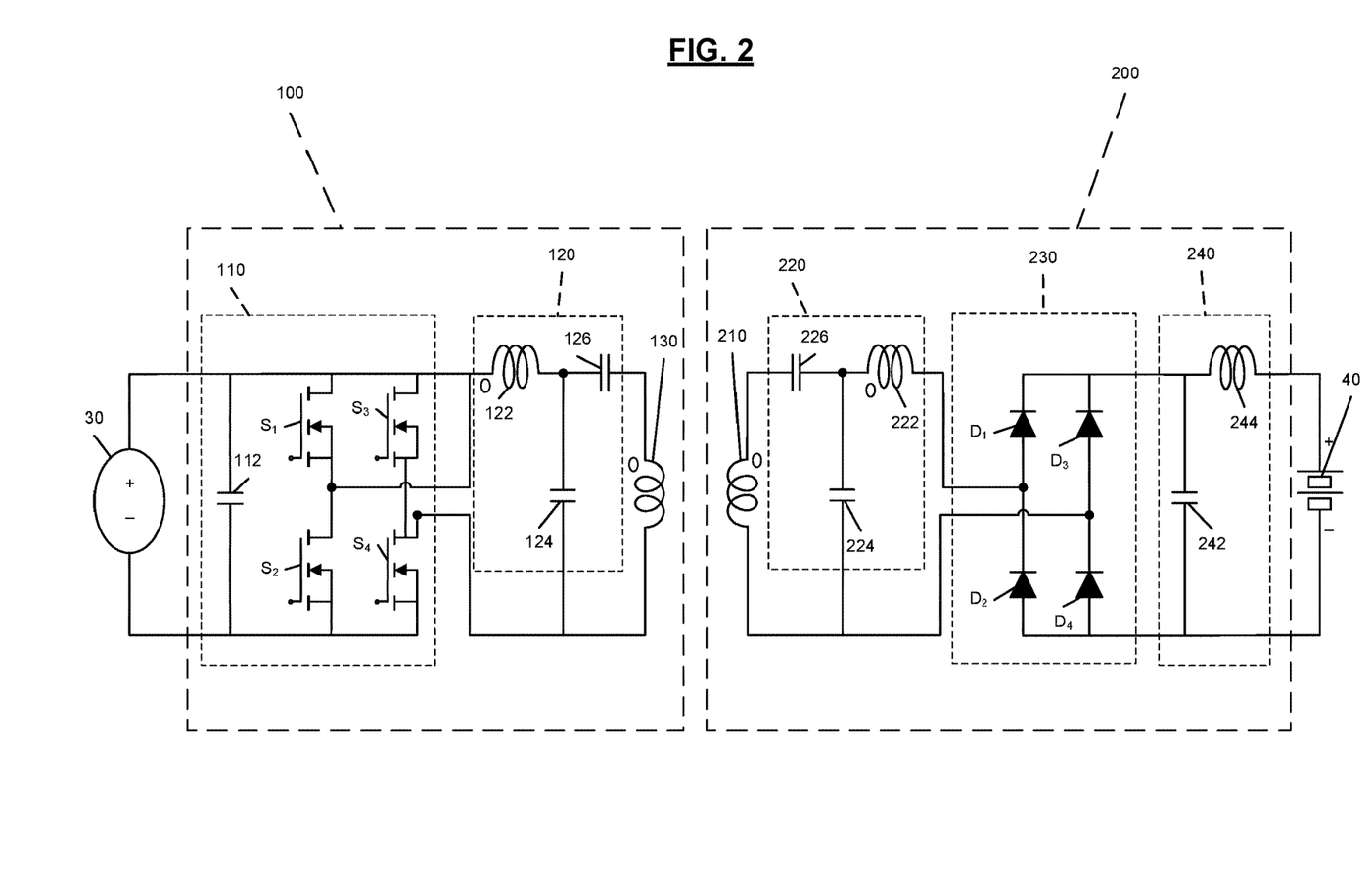
FIG. 2 is a circuit diagram of the wireless power transfer system with optimized compensation coils.

FIG. 2 is a circuit diagram of the wireless power transfer system with optimized compensation coils. In one embodiment, the power converter network 110 converts the DC voltage from the power supply 30 to the input AC signal at the desired resonant frequency, which is delivered to the transmitting coil 130 through the primary side compensation network 120. Accordingly, the power converter network 110 is an inverter network that converts both polarities of the input DC voltage into the input AC signal at the desired resonant frequency. The inverter network may be a full bridge converter circuit comprising four power MOSFETs $S_1 \sim S_4$. Alternatively, the inverter network may also be a full bridge converter comprising four bipolar junction transistors. A controller may be interfaced with each of the MOSFETs to control the switching of the MOSFETs, such that the AC output signal can be generated at the desired resonant frequency.

Alternatively, the power converter network 110 may convert the AC signal from the power supply 30 to the input AC signal at the desired resonant frequency, which is delivered to the transmitting coil 130 by way of the primary side compensation network 120. Accordingly, the power converter network 110 may include a rectifier and the inverter network. The rectifier converts the input AC signal from the power supply 30 into a pulsating DC signal. The rectifier may be implemented to increase an average amount of power that is delivered to the transmitting coil 130. The inverter network converts the pulsating DC signal into the input AC signal. A controller may be interfaced with each of the inverter network and rectifier components, such that the input AC signal can be generated at the desired resonant frequency.

Alternatively, the power converter network 110 may convert the AC signal from the power supply 30 to the input AC signal at the desired resonant frequency, provided that the power converter network 110 is a frequency converter network. In the frequency converter network, the frequency of the AC signal from the power supply 30 (60 Hz) is changed to the desired resonant frequency, while the voltage may be unchanged by the frequency converter network. Example frequency converter networks include a three-phase PWM AC-AC converter and a direct frequency converter with either a voltage source inverter (VSI) or a current source inverter (CSI).

The primary side compensation network 120 may couple the power converter network 110 to the transmitting coil 130. In one embodiment, the primary side compensation network 120 includes a primary compensation coil 122, a primary series capacitor 126, and a primary parallel capacitor 124. The primary compensation coil 122, the primary series capacitor 126, and the transmitting coil 130 are coupled in series. The primary parallel capacitor 124 is coupled to the transmitting coil 130 in parallel. The primary compensation coil 122 may be chosen to minimize the cross coupling among the coils in the wireless power transfer system and to make the wireless power transfer system compact in size.

The transmitting coil 130 may be inductively coupled to the receiving coil 210 of the vehicle 20. Consequentially, the transmitting coil 130, having received electric power, may deliver power to the receiving coil 210 wirelessly. The secondary side compensation network 220 may couple the receiving coil 210 to the rectifier network 230. The secondary side compensation network 220 may include a secondary compensation coil 222, a secondary series capacitor 226, and a secondary parallel capacitor 224. The secondary compensation coil 222, the secondary series capacitor 226, and the receiving coil 210 are coupled in series. The secondary parallel capacitor 224 is coupled to the receiving coil 210 in parallel. The secondary compensation coil 222 may be chosen to minimize the cross coupling among the coils in the wireless power transfer system and to reduce the size of the wireless power transfer system.

In other embodiments, a relay module (not shown) may couple the receiving coil 210 and the secondary side compensation network 220. The relay module couples the secondary side compensation network 220 to the rectifier network 230 in response to the receiving coil 210 inducing a voltage. The relay module may also isolate the rectifier network 230, the output tuner network 240, and the battery 40 from the secondary side compensation network 220, the receiving coil 210, and the primary side network 100 when the receiving coil 210 does not induce a voltage.

The rectifier network 230 converts the AC signal of the receiving coil 210 to a DC signal. The rectifier network 230 may include a plurality of switching components to convert the negative polarity of the input AC signal to a positive polarity. Four switching components may be used to perform the rectification, provided that the switching components are arranged in a bridge configuration. In other embodiments, two switching components may be used with a center tapped transformer to perform the rectification. The switching components may include diodes, MOSFETs, or bipolar junction transistors. In one embodiment, the rectifier network 230 includes a full bridge converter circuit with four diodes $D_1 \sim D_4$. The output pulsating DC power signal may then be delivered to the output tuner network 240, which is configured to reduce ripple voltages and ripple currents of the output DC signal. The DC signal may then be delivered to the battery 40.

The output tuner network 240 provides a voltage at the resonant frequency to the battery 40. Accordingly, the output tuner network 240 includes a tuning capacitor 242 and a tuning inductor 244 coupled in series. The inductance of the tuning inductor 244 and the capacitance of the tuning capacitor 242 may be selected such that the square root of the product of the inductance and the capacitance is equal to the resonant frequency.

In the following the primary compensation coil 122 and the secondary compensation coil 222 may be collectively referred to as compensation coils 122, 222.

Figure 3:
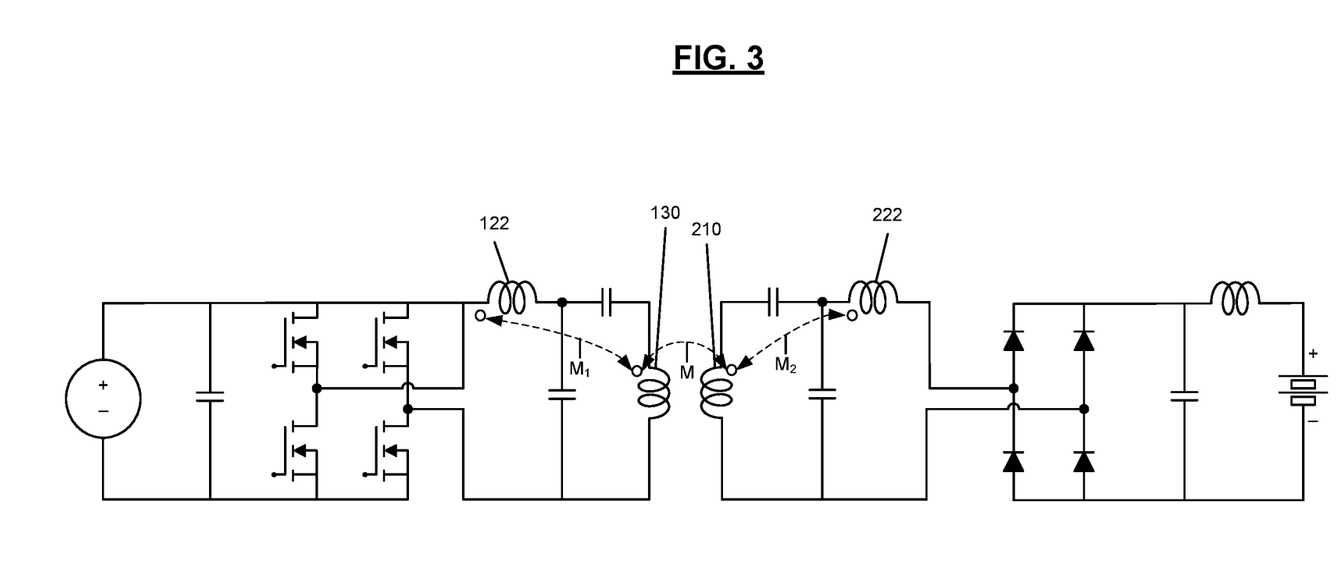
FIG. 3 illustrates the various mutual inductances of the wireless power transfer system with optimized compensation coils.

FIG. 3 illustrates the coupling effects between the compensation coils 122, 222, the transmitting coil 130, and the receiving coil 210. Not only are the transmitting coil 130 and the receiving coil 210 magnetically coupled to each other, but the primary compensation coil 122 is also coupled to the transmitting coil 130 through a shared ferrite core and is magnetically coupled to the receiving coil 210. The secondary compensation coil 222 is also coupled to the receiving coil 210 through a shared ferrite core and is magnetically coupled to the transmitting coil 130. The mutual inductances M, $M_1$, and $M_2$ may be calculated using the following equations:

$$M = k\sqrt{L_1 L_2}$$

$$M_1 = k_1\sqrt{L_1 L_{f1}}$$

$$M_2 = k_2\sqrt{L_2 L_{f2}}$$

In the above equations, M is the mutual inductance between the transmitting coil 130 and the receiving coil 210, $M_1$ is the mutual inductance between the transmitting coil 130 and the primary compensation coil 122, and $M_2$ is the mutual inductance between the receiving coil 210 and the secondary compensation coil 222. $L_1$ is the self-inductance of the transmitting coil 130, $L_2$ is the self-inductance of the receiving coil 210, $L_{f1}$ is the self-inductance of the primary compensation coil 122, and $L_{f2}$ is the self-inductance of the secondary compensation coil 222. The variable k is the coupling coefficient of the transmitting coil 130 and the receiving coil 210, $k_1$ is the coupling coefficient of the transmitting coil 130 and the primary compensation coil 122, and $k_2$ is the coupling coefficient of the receiving coil 210 and the secondary compensation coil 222.

The wireless power transfer systems of HEVs and EVs generally have a large leakage inductance and a small mutual inductance. Since only the mutual inductances contribute to the power transfer and efficiency, the self-inductances are compensated as described herein.

Figure 4A:
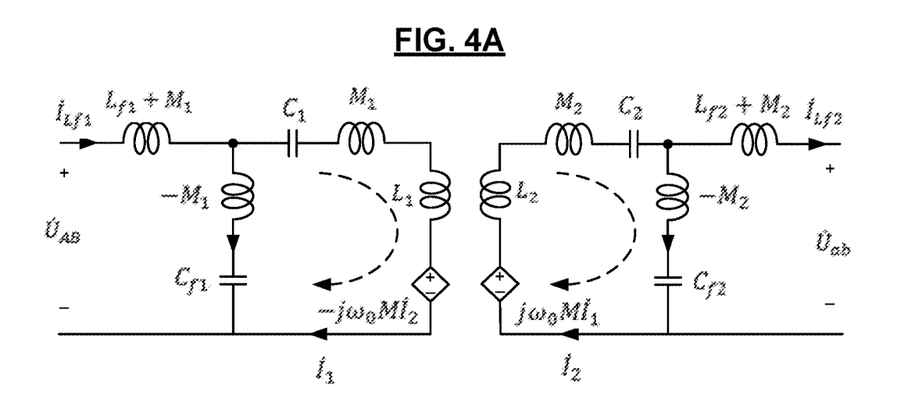
FIGS. 4A and 4B illustrate a decoupled model of the wireless power transfer system with optimized compensation coils.

FIG. 4A illustrates the decoupled model of the wireless power transfer system with optimized compensation coils. Given that the constant resonant angular frequency is $\omega_0$, $C_1$ is the capacitance of the primary series capacitor 126, $C_2$ is the capacitance of the secondary series capacitor 226, $C_{f1}$ is the capacitance of the primary parallel capacitor 124, and $C_{f2}$ is the capacitance of the secondary parallel capacitor 224, the circuit can be simplified by the following equations:

$$L_{f1e} = L_{f1} + M_1$$

$$L_{f2e} = L_{f2} + M_2$$

$$C_{f1e} = \frac{C_{f1}}{\omega_0^2 M_1 C_{f1} + 1}$$

$$C_{f2e} = \frac{C_{f2}}{\omega_0^2 M_2 C_{f2} + 1}$$

$$L_{e1} = L_1 + M_1 - \frac{1}{\omega_0^2 C_1}$$

$$L_{e2} = L_2 + M_2 - \frac{1}{\omega_0^2 C_2}$$

$L_{f1e}$ is the equivalent inductance of the primary compensation coil 122 and the mutual inductance $M_1$, and $L_{f2e}$ is the equivalent inductance of the secondary compensation coil 222 and the mutual inductance $M_2$. $L_{e1}$ is the equivalent inductance of the primary series capacitor 126 and the transmitting coil 130, and $L_{e2}$ is the equivalent inductance of the secondary series capacitor 226 and the receiving coil 210. $C_{f1e}$ is the equivalent capacitance of the primary parallel capacitor 124 and the mutual inductance $M_1$, and $C_{f2e}$ is the equivalent capacitance of the secondary parallel capacitor 224 and the mutual inductance $M_2$.

Figure 4B:
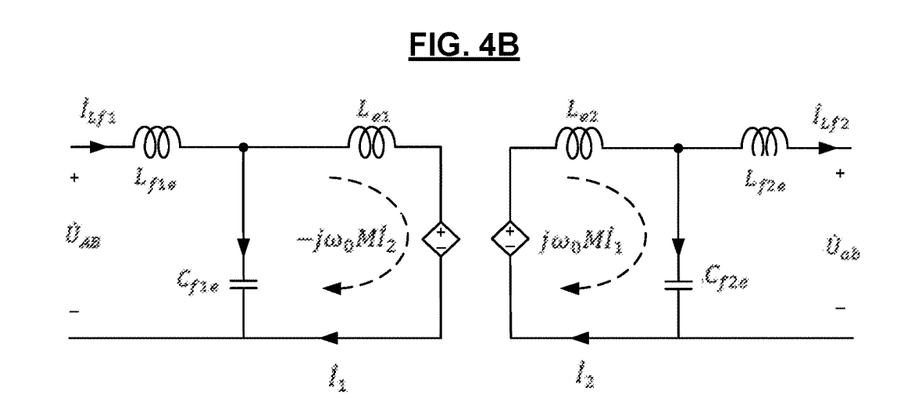

From the above equations, the simplified equivalent circuit is shown in FIG. 4B. The primary and secondary compensation networks are LCL resonant converters and, therefore, the output current is constant if operating at resonant frequency. In one embodiment, we assume the following:

$$L_{f1e} = L_{e1}$$

$$L_{f2e} = L_{e2}$$

$$\omega_0 = \frac{1}{\sqrt{L_{f1e}C_{f1e}}} = \frac{1}{\sqrt{L_{f2e}C_{f2e}}} = \frac{1}{\sqrt{L_{f1}C_{f1}}}$$

From the above equations, the following equation can be derived:

$$L_1 - L_{f1} = \frac{1}{\omega_0^2 C_1}$$

From the above equations, $L_1$, $L_{f1}$, $C_{f1}$, and $C_1$ are determined and, thus, the resonant frequency is fixed and independent of the coupling coefficient and the load condition.

Given that $\dot{U}_{AB}$ is the first order root mean square (RMS) value of the input voltage and $\dot{U}_{ab}$ is the first order RMS value of the output voltage before the rectifier network 230, the following equations provide the phasor currents of the transmitting and receiving coil 130, 210:

$$\dot{I}_1 = \frac{\dot{U}_{AB}}{j\omega_0 L_{f1e}}$$

$$\dot{I}_2 = -\frac{\dot{U}_{ab}}{j\omega_0 L_{f2e}}$$

$$\dot{I}_{Lf1} = \frac{M\dot{I}_2}{L_{f1e}}$$

$$\dot{I}_{Lf2} = \frac{M\dot{I}_1}{L_{f2e}}$$

In the above equations, $\dot{I}_1$ is the phasor of the current on the transmitting coil 130, $\dot{I}_2$ is the phasor of the current on the receiving coil 210, $\dot{I}_{Lf1}$ is the phasor of the current on the primary compensation coil 122, and $\dot{I}_{Lf2}$ is the phasor of the current on the secondary compensation coil 222. From the above equations, the power at the output is represented by the following equations:

$$P_o = \frac{k\sqrt{L_1 L_2}}{\omega_0(L_{f1} + M_1)(L_{f2} + M_2)} \dot{U}_{AB}\dot{U}_{ab}$$

$$P_o = \frac{M}{\omega_0(L_{f1} + M_1)(L_{f2} + M_2)} \dot{U}_{AB}\dot{U}_{ab}$$

Based on the foregoing, to generate the optimal power efficiency and output power, mutual inductance between the transmitting coil 130 and the receiving coil 210 (M) should be maximized, while the mutual inductances between the primary compensation coil 122 and the transmitting coil 130 (i.e., $M_1$) and between the secondary compensation coil 222 and the receiving coil 210 (i.e., $M_2$) should be minimized. $M_1$ and $M_2$ may contribute to circulating power losses to the wireless power transfer system as a result of the couplings.

Figure 5A:
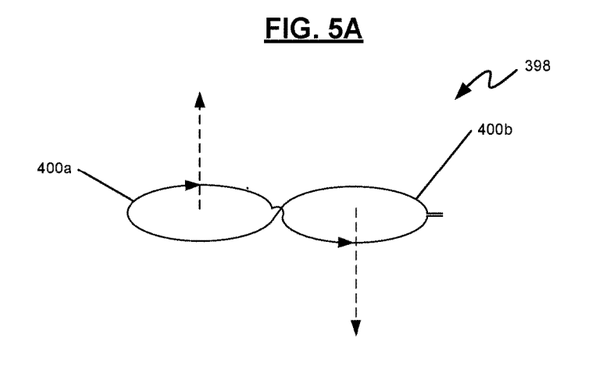
FIGS. 5A, 5B, and 5C illustrate the implementation of different coil designs to be used in the wireless power transfer system.
Figure 5B:
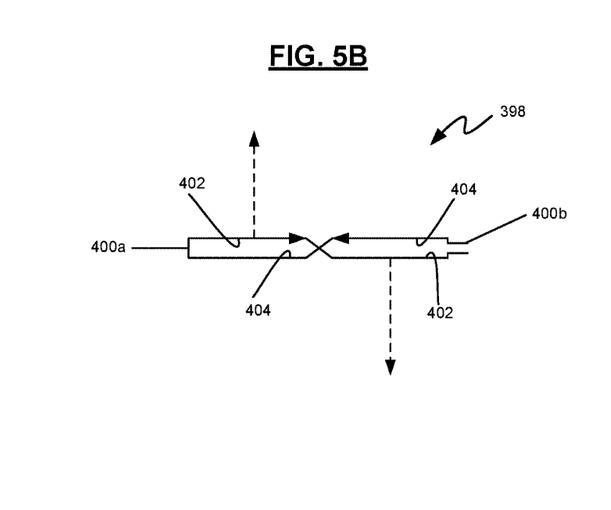
Figure 5C:
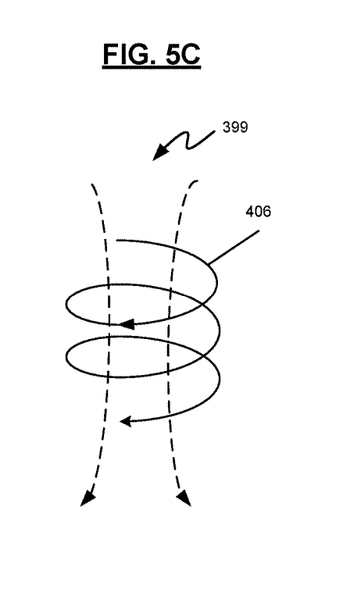

FIGS. 5A, 5B, and 5C illustrate the different coil designs to be used in the wireless power transfer system of the present disclosure to minimize mutual inductance $M_1$ and $M_2$. The coil designs to be implemented in the wireless power transfer system include a bipolar coil design and a unipolar coil design of the present disclosure. The bipolar coil design is illustrated in FIGS. 5A and 5B, and the unipolar coil design is illustrated in FIG. 5C.

With reference to FIGS. 5A and 5B, a bipolar coil 398 may be provided as a single coil that is partitioned into two separate coil poles 400a, 400b. The first coil pole 400a and the second coil pole 400b of the bipolar coil 398 may have an equal coil area, thus allowing the magnetic flux generated by each pole to be of equal magnitude.

The bipolar coil 398 may have surfaces 402 and 404. In addition, the bipolar coil 398 may have a twisting configuration, where the respective surfaces 402, 404 of each coil pole 400a, 400b are not on a same plane. More particularly, the surface 402 of coil pole 400a is not on the same plane as the surface 402 for coil pole 400b. With the surfaces 402, 404 of the coil poles 400a, 400b located on separate planes, the current of each coil pole 400a, 400b flows in opposite directions, as indicated by the solid arrows in FIGS. 5A and 5B. Consequently, the magnetic flux generated at each coil pole 400a, 400b will flow in opposite directions as well, as indicated by the dashed arrows in FIGS. 5A and 5B.

With reference to FIG. 5C, a unipolar coil 399 may be provided as a single coil wire that has a single pole 406, and thus has magnetic flux that flows in one direction, as indicated by the dashed arrow in FIG. 5C.

Figure 6A:
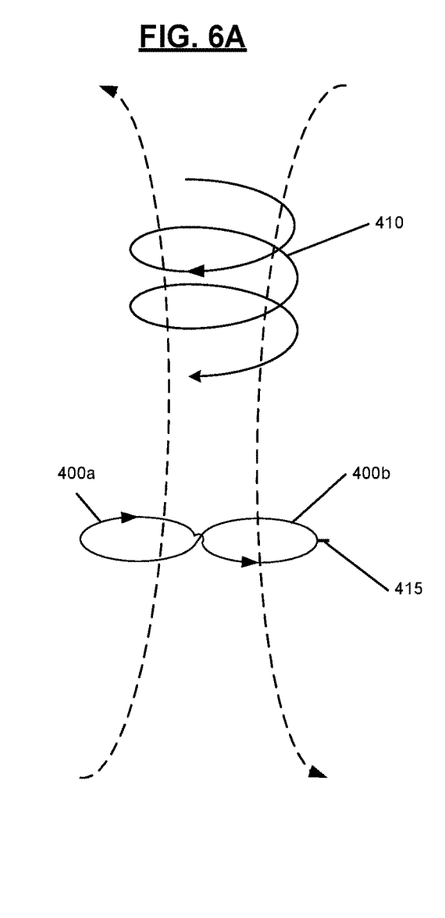
FIGS. 6A and 6B illustrate a wireless power transfer system with a combination of main coils and compensation coils of different polar designs.
Figure 6B:
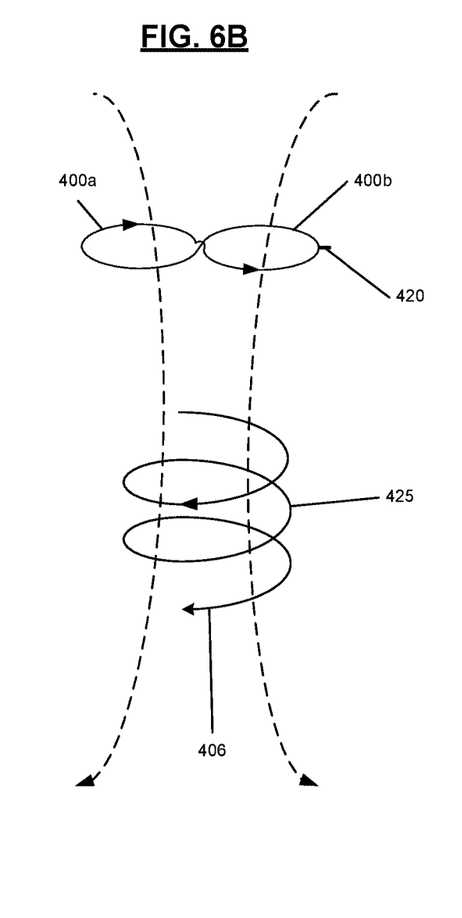

FIGS. 6A and 6B illustrate a main coil and a compensation coil with unipolar and bipolar designs. In the following, the main coil may represent the transmitting coil 130 and/or the receiving coil 210, and the compensation coil may represent the primary compensation coil 122 and/or the secondary compensation coil 222.

FIG. 6A illustrates a compensation coil 410 having a unipolar coil design and a main coil 415 having a bipolar coil design. The compensation coil 410 generates a net magnetic flux, since the magnetic flux flows in a single direction. However, the bipolar main coil 415 generates magnetic flux in opposite directions at each coil pole 400a, 400b. In one embodiment, the magnetic flux generated by coil pole 400a flows into the compensation coil 410. This magnetic flux generated by the coil pole 400a flows in an opposite direction of the magnetic flux of the compensation coil 410. Thus, the net magnetic flux generated at the compensation coil 410 by the main coil 415 may be substantially reduced. Consequently, the mutual inductance between the compensation coil 410 and the main coil 415 is also substantially reduced. Thus, the overall power efficiency of the wireless transfer system improves.

The area of each coil pole 400a, 400b may be varied such that the magnetic flux generated at the main coil 415 and the magnetic flux flowing into the compensation coil 410 are equal in magnitude. Thus, the net magnetic flux generated at the compensation coil 410 by the main coil 415 is substantially zero. The absence of mutual inductance between the compensation coil 410 and the main coil 415 improves the overall efficiency of the wireless power transfer system.

FIG. 6B illustrates the use of a main coil 425 having a unipolar design and the use of a compensation coil 420 having a bipolar design. The compensation coil 420 generates a magnetic flux in each direction as a result of the opposite current flow of each coil pole 400a, 400b. However, the main coil 425 generates magnetic flux in a single direction, which is opposite the magnetic flux of coil pole 400a in this embodiment. Thus, the net magnetic flux generated at the compensation coil 420 by the main coil 425 may be substantially reduced. Consequently, the mutual inductance between the compensation coil 420 and the main coil 425 is also substantially reduced. Thus, the overall power efficiency of the wireless transfer system improves.

The area of the single coil pole 406 may be varied such that the magnetic flux generated at the main coil 425 and the magnetic flux flowing into the coil pole 400a,400b of the compensation coil 420 are equal in magnitude. Thus, the net magnetic flux generated at the compensation coil 420 by the main coil 425 is substantially zero. The absence of mutual inductance between the compensation coil 420 and the main coil 425 improves the overall efficiency of the wireless power transfer system.

Figure 7:
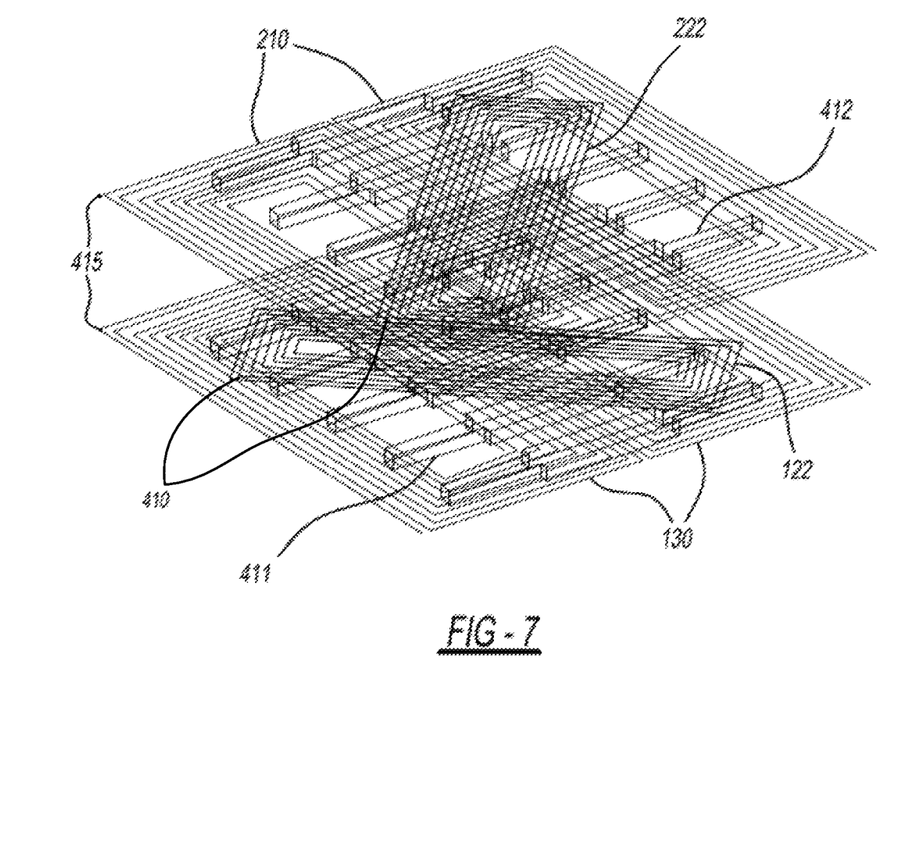
FIG. 7 illustrates an example embodiment that includes the wireless power transfer system with bipolar main coils and unipolar compensation coils.

FIG. 7 is an example embodiment that includes the wireless power transfer system in which the transmitting coil 130 and the receiving coil 210, as main coils, have a bipolar coil design and the primary compensation coil 122 and the secondary compensation coil, as compensation coils, have a unipolar coil design. The transmitting coil 130 with coil poles is coupled to a plurality of primary side magnetic cores 411. The primary compensation coil 122 is also coupled to the plurality of primary side magnetic cores 411. The receiving coil 210 is coupled to a plurality of secondary side magnetic cores 412. The secondary compensation coil 222 is also coupled to the plurality of secondary side magnetic cores 412. In one embodiment, the primary side magnetic cores 411 and the secondary side magnetic cores 412 are ferrite magnetic bars. The compensation coils 122,222 are designed to maximally utilize the plurality of magnetic cores 411,412, such that the optimal balance between using large inductances and using the minimal length of copper wire is realized. This allows for the wireless power transfer system to be optimized in terms of physical design by making the system compact.

With the transmitting coil 130 having a bipolar coil design and the primary compensation coil 122 having a unipolar coil design, the two coils perform in similar manner as the main coil 415 and compensation coil 410 of FIG. 6A to reduce the mutual inductance between the transmitting coil 130 and the compensation coil 122. Similarly, the receiving coil 210 having the bipolar coil design and the secondary compensation coil 222 having the unipolar coil design are also configured to reduce the mutual inductance between the two coils, as discussed in detailed with respect to FIG. 6A.

Figure 8:
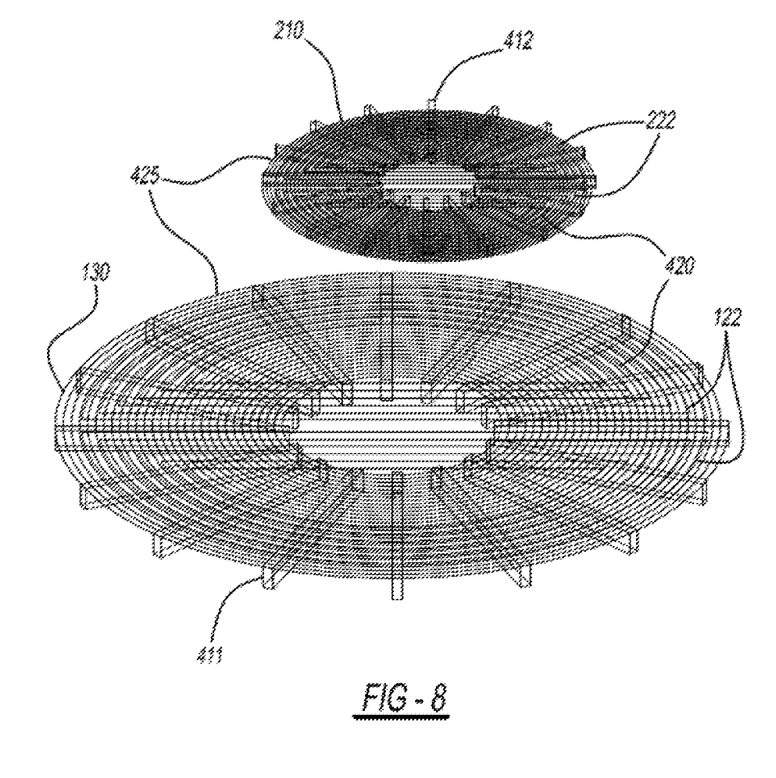
FIG. 8 illustrates an example embodiment that includes the wireless power transfer system with unipolar main coils and bipolar compensation coils.

FIG. 8 is an example embodiment that includes the wireless power transfer system with unipolar main coils 425 and bipolar compensation coils 420 of FIG. 6B. In this figure, the transmitting coil 130 and the receiving coil 210 have a unipolar coil design, and the primary side compensation coil 122 and the secondary compensation coil 222 have a bipolar coil design.

The transmitting coil 130 and the primary compensation coil 122 are coupled to the plurality of primary side magnetic cores 411. The receiving coil 210 and the secondary compensation coil 222 are coupled to the plurality of secondary side magnetic cores 412. Similar to the main coil 425 and the compensation coil 420 of FIG. 6B, the mutual inductance between the transmitting coil 130 and the primary compensation coil 122 and the mutual inductance between the receiving coil 210 and the secondary compensation coil 222 are significantly reduced.

The wireless power transfer system of the present disclosure, reduces the cross-coupling between the transmitting coil and the primary compensation coil and between the receiving coil and the secondary compensation coil. More particularly, by having the main coils (i.e., transmitting coil and the receiving coil) configured as one of the bipolar design or unipolar design and the compensation coils (i.e., the primary and secondary compensation coils) as the other one of the bipolar design or unipolar design, the mutual inductance between a given main coil and respective compensation coil is significantly reduced. Therefore, the efficiency of the wireless power transfer system is improved.

The foregoing description of the embodiments has been provided for purposes of illustration and description. It is not intended to be exhaustive or to limit the disclosure. Individual elements or features of a particular embodiment are generally not limited to that particular embodiment but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular example embodiments only, and is not intended to be limiting. As used herein, the singular forms "a," "an," and "the" may be intended to include the plural forms as well, unless the context clearly indicates otherwise. The terms "comprises," "comprising," "including," and "having," are inclusive and, therefore, specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers, and/or sections, these elements, components, regions, layers, and/or sections should not be limited by these terms. These terms may be only used to distinguish one element, component, region, layer, or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A wireless power transfer system for charging an automobile battery, the wireless power transfer system comprising:
    a primary side network including a transmitting coil, a primary side compensation network, and a plurality of primary magnetic cores, wherein the transmitting coil is configured to receive power from a power supply, and the primary side compensation network includes a primary compensation coil; and
    a secondary side network that is inductively coupled to the primary side network and is configured to receive power from the primary side network, the secondary side network including a receiving coil, a secondary side compensation network, and a plurality of secondary magnetic cores, wherein the receiving coil is configured to induce a voltage in response to the transmitting coil receiving power, and the secondary side compensation network includes a secondary compensation coil, wherein:
    the primary compensation coil and the secondary compensation coil has one of a unipolar coil design and a bipolar coil design, and
    the transmitting coil and the receiving coil has the other one of the unipolar coil design and the bipolar coil design.

2. The wireless power transfer system of claim 1 wherein the primary compensation coil and the secondary compensation network have the unipolar coil design and the transmitting coil and the receiving coil have the bipolar coil design.

3. The wireless power transfer system of claim 1 wherein the primary compensation coil and the secondary compensation network have the bipolar coil design and the transmitting coil and the receiving coil have the unipolar coil design.

4. The wireless power transfer system of claim 1 further comprising:
    a power converter network configured to convert an AC voltage from the power supply into an input AC voltage, wherein the transmitting coil receives voltage based on the input AC voltage.

5. The wireless power transfer system of claim 1 further comprising:
    a power converter network configured to convert a DC voltage from the power supply into an input AC voltage, wherein the transmitting coil receives voltage based on the input AC voltage.

6. The wireless power transfer system of claim 1 wherein:
    the primary side compensation network includes a primary series capacitor and a primary side parallel capacitor,
    the transmitting coil is serially coupled to the primary series capacitor,
    the primary series capacitor is serially coupled to the primary compensation coil, and
    the primary side parallel capacitor is coupled to the transmitting coil in parallel.

7. The wireless power transfer system of claim 1 wherein:
    the secondary side compensation network includes a secondary series capacitor and a secondary parallel capacitor,
    the receiving coil is serially coupled to the secondary series capacitor,
    the secondary series capacitor is serially coupled to the secondary compensation coil, and
    the secondary parallel capacitor is coupled to the receiving coil in parallel.

8. The wireless power transfer system of claim 1 wherein the secondary side network further includes a rectifier network connected to the secondary side compensation network.

9. The wireless power transfer system of claim 1 wherein the secondary side network further includes an output tuner network and a rectifier network, wherein the rectifier network is connected to the secondary side compensation network and the output tuner network is connected to the rectifier network.

10. The wireless power transfer system of claim 1 wherein:
    the bipolar coil design has two coil poles of equal coil area, and a current flowing in one of the two coil poles is in direction opposite to a current flowing in the other one of the two coil poles, and
    the unipolar coil design has a single coil pole.

11. The wireless power transfer system of claim 1 wherein, with the primary compensation coil and the secondary compensation coil having the unipolar coil design and the transmitting coil and the receiving coil having the bipolar coil design:
    the primary compensation coil and the secondary compensation coil each have a single coil pole and the transmitting coil and the receiving coil each have two coil poles, and
    an area of each of the two coil poles of the bipolar coil design is configured such that a magnetic flux generated by the two coil poles is equal in magnitude to a magnetic flux of the single coil pole of the unipolar coil design.

12. The wireless power transfer system of claim 1 wherein, with the primary compensation coil and the secondary compensation coil having the bipolar coil design and the transmitting coil and the receiving coil having the unipolar coil design:
    the primary compensation coil and the secondary compensation coil each have two coil poles and the transmitting coil and the receiving coil each have a single coil pole, and
    an area of the single coil pole of the unipolar coil design is configured such that a magnetic flux generated by the single coil pole is equal in magnitude to a magnetic flux of the two coil poles of the bipolar coil design.

13. The wireless power transfer system of claim 1 wherein the transmitting coil and the primary compensation coil are coupled to the plurality of primary magnetic cores.

14. The wireless power transfer system of claim 1 wherein the receiving coil and the secondary compensation coil are coupled to the plurality of secondary magnetic cores.

\* \* \* \* \*